Patented May 8, 1951

2,551,675

UNITED STATES PATENT OFFICE 2,551,675

PRODUCTION OF ADIPIC ACID

John C. Hillyer and James T. Edmonds, Bartlesville, Okla., assignors to Phillips Petroleum Company, a corporation of Delaware No Drawing. Application November 17, 1949, Serial No. 127,988

7 Claims. (Cl. 260—537)

This invention relates to the manufacture of adipic acid. In one embodiment this invention relates to the conversion of a selected lactone to adipic acid. In another embodiment this invention relates to the utilization of furfural and butadiene in the manufacture of adipic acid. In still another embodiment, this invention relates to the utilization of a by-product material of an extractive distillation process employing furfural, in the manufacture of adipic acid.

In a recently developed procedure for the manufacture of adipic acid, furfural is employed as a starting material. Furfural is abundantly available from the acid digestion of vegetable wastes such as oat hulls, corn cobs, and the like, and is a cheap raw material in such manufactures. However, in such a process, numerous steps are required, involving large expenditures for equipment and operation. These steps include hydrogenation of the furfural to saturate the ring, suitable treatment to remove the aldehyde group, subsequent rupture of the furan ring by treatment with a halogen to produce 1,4-dihalobutane, lengthening the carbon chain by treatment with a cyanide to produce dicyanobutane, and finally hydrolysis to the desired adipic acid.

Although the cost of such a starting material as furfural is low, the procedure for its conversion to adipic acid is economically undesirable from the standpoint of time, manpower, and equipment requirements.

This invention is concerned with the utilization of a lactone derivative of furfural, as a starting material in a new and efficient process for the manufacture of adipic acid.

An object of this invention is to provide for the manufacture of adipic acid.

Another object of this invention is to provide for the manufacture of adipic acid from furfural.

Another object is to provide for the manufacture of adipic acid from a by-product material of an extractive distillation employing furfural as a selective solvent, in the recovery of butadiene from a butene-butadiene hydrocarbon mixture.

Another object is to provide for the manufacture of adipic acid from a selected lactone.

Other objects will be apparent to one skilled in the art from the accompanying discussion and disclosure.

In accordance with one embodiment of our invention, adipic acid is produced from furfural, by first condensing furfural with butadiene and water to form a lactone and then by hydrogenating the lactone so-produced, followed by oxidation of the hydrogenated lactone product. In the condensation reaction above referred to, one molecule each of furfural, butadiene and water react together to form a lactone having the empirical formula $C_9H_{12}O_3$, the resulting condensation reaction product being a solid crystalline material which will be discussed in more detail hereinafter.

The hydrogenation step is conducted in the presence of a catalyst at a temperature generally in the range of 60–300° F., preferred temperatures being generally within the limits of 60–150 F. At temperatures above 300 F., undesirable side reactions occur, particularly hydrogenolysis, and control of the reaction is difficult.

We conduct the hydrogenation in the presence of a hydrogenation catalyst, by which term we mean to include any catalyst active in promoting the addition of free hydrogen to an unsaturated carbon to carbon linkage. Various well known hydrogenation catalysts are metals such as palladium, zirconium, nickel, cobalt, copper, thorium, iron, and the like. Metal hydrogenation catalysts, such as those above named, are generally applied in a finely divided state, and can be supported, if desired. Among other well known hydrogenation catalysts are molybdenum oxide, chromium oxide, copper chromite and nickel chromite.

In carrying out the hydrogenation step, the lactone material is preferably dissolved in an inert solvent. Although it is generally preferable to have the lactone reactant completely dissolved in the selected solvent, complete solution is not an absolute requisite. It is often convenient to employ a saturated solution of crystals in the inert solvent, the presence of any undissolved crystals being immaterial, since under such conditions we have found them to be easily hydrogenated. Preferred solvents used in the hydrogenation step include cyclohexanol, dioxane, methanol, ethanol, and in general any suitable solvent having from 4 to 6 carbon atoms in the molecule.

In one embodiment, we can conduct the hydrogenation step at a temperature above the melting point of the lactone starting material, i. e. in the range of about 280–300 F. and thereby eliminate the need for a solvent. However, for most accurate control of the hydrogenation reaction, we prefer to use the inert solvent and operate within the preferred temperature range.

Hydrogenation pressure is necessarily sufficiently high to maintain the solution of lactone in liquid phase at hydrogenation temperature. Generally, a pressure as high as from 20 to 100 p. s. i. g. is preferred. However, when desired, an operating pressure as high as 800–1000 p. s. i. g. may be employed but at pressures above about 1000 p. s. i. g., the hydrogenation is difficult to control, and extensive undesirable side reactions occur.

In carrying out the oxidation step, various suitable oxidizing agents may be utilized. We prefer generally to employ concentrated nitric acid, although aqueous nitric acid as dilute as 30 weight per cent can be used. We also often prefer to employ an aqueous alkali metal dichromate acidified with sulfuric acid. When employing the acidified dichromate we prefer usually to use about 400 parts by weight of 100 per cent $H_2SO_4$ per 300 parts by weight of sodium dichromate,

In any case, we prefer to employ the 100 per cent $H_2SO_4$ in a weight ratio to the dichromate within the limits of 1.3:1 to 2:1, and often in such a ratio within the limits of 1.4:1 to 1.6:1. Other suitable oxidation agents that can be employed include acidified aqueous permanganate, particularly potassium permanganate, and nitrogen oxides, such as $N_2O$ and $N_2O_4$.

Although the oxidation step of the process of our invention can be conducted non-catalytically, particularly when employing concentrated nitric acid as the oxidizing agent, we often prefer to conduct the oxidation in the presence of a catalyst in order to effect the oxidation either in a shorter time, or at a lower temperature, or both. Any known catalyst, active in promoting oxidation of hydrocarbons, or oxygen derivatives of hydrocarbons, can be utilized in the practice of our invention. Several such well known catalysts are vanadium pentoxide, ammonium vanadate, copper nitrate, mercury sulfate, molybdenum sulfate, and the like.

We conduct the oxidation at a temperature within the limits of 100–200 F. and more often utilize a temperature within the limits of 130–150 F., since in that temperature range the reaction is most easily controlled to produce adipic acid in high yield. At temperatures higher than 200 F., extensive undesirable side reactions occur with concomitantly low product yield.

Generally we have prepared the lactone starting material above referred to by the interaction of butadiene, furfural, and water. This lactone material is a condensation product of butadiene, water, and furfural. A preferred procedure for the preparation of this lactone material is illustrated with a reaction system comprising furfural and from 1–50 per cent water, and 3–50 per cent butadiene, based on the weight of furfural. The reactant materials for such a system are charged to an autoclave and maintained at a temperature generally within the range of from about 200–300 F. for a reaction time from about 5 to about 125 hours. Unchanged reactants and any butadiene polymer are removed from the resulting reaction product and the higher boiling portion is fractionated under reduced pressure, i. e. preferably below 5 mm. of mercury, to recover the lactone starting material of our invention.

Higher temperatures, i. e. above about 300 F., accelerate undesirable secondary condensations during the lactone preparation step, above described, to an extent that they generally should be avoided. While a good quality lactone product can be obtained at relatively low temperature, operations below about 160 F. usually require substantially extended time. Pressures are, in general, not critical, and while effective conversion is usually obtained at the pressures normally developed at the operating temperature, they may be varied to any desired level such as by admission of nitrogen or other inert gas. It is preferred to have the furfural-butadiene-water reactants present in the reaction zone primarily in liquid phase. Distillation of the residual lactone-containing product under reduced pressure conditions below about 5 mm. of mercury absolute, is preferred, since substantial losses through secondary condensations, pyrolytic decomposition, and the like, usually result from the higher temperatures required when employing fractionation at higher distillation pressures, particularly a pressure as high as 1 atmosphere.

The lactone starting material can be obtained as a by-product of an extractive distillation process involving the use of furfural as a selective solvent in the separation of butadiene from a butadiene-butene hydrocarbon mixture undergoing fractional distillation in a distillation column. In such a process the butadiene-butene stream is contacted with furfural generally containing from 4–6 per cent water. Temperatures in various parts of the extractive distillation system range up to about 325 F., and the total contact time of butadiene, water, and furfural in the extractive distillation column is sufficiently long to provide for some appreciable "side reaction," or condensation, of furfural with water and butadiene, and the concomitant formation of some lactone by-product. The magnitude of such extractive distillation operations is such that large volumes of furfural are in constant circulation in the system, and thus even a low conversion of furfural to the lactone provides large amounts of the lactone product that can be utilized as a starting material in the process of our invention.

In the separation of butadiene from a butene stream in accordance with the extractive distillation procedure above referred to, it is generally customary to divert a small proportion, usually about 1 or 2 per cent of the circulating furfural stream, to a furfural rerun system, generally a steam of vacuum redistillation system, for the purpose of removing by-product furfural polymers. In such a rerun system, the furfural-butadiene-water reaction product is separated from the furfural, as a part of a tarry bottoms product, containing large amounts of resinous furfural polymer together with certain aldehydic products of furfural-butadiene reaction, and the lactone condensate that we utilize as a starting material in the practice of our invention. Separation of this latter lactone material from the tar can be effected by a high vacuum distillation, generally at about 1 mm. pressure, or less, while employing a kettle temperature preferably in the range of from 150–250 F. The lactone condensate fraction obtained in this manner is free from furfural polymer and from at least a major proportion of aldehyde by-product, and is generally at least partially crystalline.

Steam distillation, when used in the removal of tar from the furfural side stream, provides large amounts of water condensate, which collect with the bottoms product. The aqueous phase thus formed carries in solution a large proportion of the lactone by-product, which can be recovered by distillation.

In a preferred practice of our invention we dissolve the lactone starting material in the selected inert organic solvent generally ethanol or methanol in a weight ratio of starting material to solvent within the range of 1:1 to 1:10. A higher state of dilution of the hydrogenation reaction mixture is not particularly advantageous and requires unduly large scale equipment. We admix the resulting solution with the selected hydrogenation catalyst, the amount of catalyst generally being within the limits of from 1 to 15 per cent by weight, based on the lactone reactant in the system. However, larger or smaller amounts of hydrogenation catalyst may be employed, when desired. We generally employ palladium or nickel catalysts, the former, preferably supported in an amount of from 1–10 per cent by weight on activated charcoal. The hydrogenation reaction admixture is then contacted with hydrogen, generally by passing hydrogen through the admixture, at a temperature with the limits of 60–100 F., for a period of from 0.5 to 10 hours. Catalyst is then removed from the total hydrogenation product, generally by filtration or decantation, and the solvent is removed, generally by distillation.

The residual hydrogenation product thus obtained, is contacted with a liquid oxidizing agent at a temperature in the preferred range and oxidized to form the desired adipic acid product. We generally do this by gradually adding the residual hydrogenation product to the liquid oxidizing agent, either alone or in admixture with a selected oxidation catalyst. For example when employing concentrated nitric acid we often utilize vanadium pentoxide. In that case we form a mixture of oxidizing agent and catalyst in a proportion of $V_2O_5$ to 100 ml. nitric acid, within the limits of about 0.2 to 10 grams. Such a catalyst proportion is generally applicable in any case, although in some specific instances, depending on the oxidation catalyst and oxidizing agent selected, other proportions may be desired. The rate at which we add the lactone reactant material is limited only by the oxidation reaction temperature developed, and is accordingly governed to regulate the oxidation temperature to within a temperature range, already described. Subsequent to adding the lactone reactant to the oxidation system, it is advantageous to further heat the resulting reaction mixture at its existing temperature, or in any case, at a temperature below 200 F., for a period of from 15 minutes to about 1 hour, or longer if desired. Operating in this manner, the oxidation is very nearly complete, and, unless the reaction time is extended as above discussed, lower conversions of lactone to adipic acid will be obtained.

At the end of the oxidation reaction period, the catalyst, if one is employed, is removed from the oxidation reaction mixture, and the adipic acid recovered. Solvent extraction is generally employed in the recovery step, although when employing nitric acid as the oxidizing agent, crystalline adipic acid product is formed and recovered by cooling a hot catalyst-free oxidation reaction mixture. In any case, adipic acid crystals can be further purified by recrystallization from concentrated nitric acid.

It is to be understood that the hydrogenation step and oxidation steps of our invention can be conducted in any suitable manner, and that our invention is not limited to the preferred procedure discussed hereinabove.

It is a feature of our invention that it is unnecessary to utilize the lactone reactant in a high state of purity, thus eliminating the cost of a final purification that would otherwise be required. We have found that we can use a crude lactone-containing fraction recovered as a product of condensation of butadiene, water, and furfural, conducted under preparation conditions already discussed herein, or effected as a side reaction in an extractive distillation method of the type already discussed. This feature is particularly advantageous when utilizing the by-product material obtained from the furfural purification step already described. The tarry phase from the extractive distillation process, when distilled under reduced pressure, yields the lactone product together with some aldehydic materials, and these products can be readily separated to isolate the lactone in any desired purity. However, since the aldehydic by-product materials present in such a lactone-containing fraction do not affect the reactions of our invention in any way, it is advantageous, from an economic standpoint, to permit their presence, thereby eliminating purification costs.

Recovery of a lactone-containing fraction from the steam condensate, when steam distillation is employed in the furfural rerun step, may be effected by evaporation of the water, and the residual product may be utilized as our starting material. However when desired, the residual product from such steam-condensate distillation may be further purified by means of solvent extraction, with a selective solvent such as acetone for example, to remove the lactone product in any desired degree of purity.

Our invention is illustrated by the following examples. The reactants, their proportions, and other specific ingredients are presented as being typical and should not be construed to limit the invention unduly.

Example I

Freshly steam distilled furfural containing five per cent by weight of water was charged to a steel reaction vessel. Sufficient 1,3-butadiene was added to give a butadiene concentration of 4.0 per cent in the reaction mixture. The composition of the charge material was

| | Parts by weight |
|---|---|
| Furfural | 91.2 |
| Butadiene | 4.0 |
| Water | 4.8 |

The temperature within the reaction vessel was maintained at 260 F. for 70 hours. The reaction product was then transferred to a specially designed distilling flask and stripped of water, unreacted furfural, and butadiene under a pressure of from two to five mm. of mercury. A residue containing some furfural, and the furfural-butadiene and furfural-butadiene-water condensation products, was transferred to a flask bearing a Vigreaux column and fractionated at pressures in the range 0.5–0.2 mm. of mercury. Initial overhead distillation product was aldehydic in nature. A subsequent, i. e. heavier fraction, was obtained comprising a mixture of white crystals and a red viscous liquid. The crystals which appeared in this fraction had a melting point (crude) of 245 F. to 250 F., a melting point after crystallization of 276 F. and an acidity of 0.0 per cent, an aldehyde content of 0.0 per cent, and a molecular weight of about 168. They were insoluble in pentane and soluble in acetone, water, benzene, methanol, cyclohexane and carbon disulfide.

In the preparation of large quantities of reaction product from butadiene, water, and furfural, in accordance with the procedure above described, the reddish oil, containing the white crystalline product, after standing for a prolonged period of several months contained an increased concentration of white crystals. Fourteen parts by weight of this material boiling at 260-290 F. at 0.5 mm. was redistilled at 0.5 mm. in a packed, silvered column. Approximately 1 part of the light reaction product was separated followed by 2 parts of a white crystalline solid. The remaining overhead product was a heavy oil. The residue was transferred to a very small flask, but no further crystalline products could be distilled and no crystals separated from the oily overhead material.

The crystalline material was found to melt at 267-268 F. It had a neutralization equivalent of 192. An initial determination of the molecular weight, determined in benzene by the freezing point, was 180, though difficulty was experienced with low solubility. Determination by the Rast camphor method gave a value of 158. The material is soluble in water, alcohol, and dilute sodium hydroxide solution. Preliminary carbon and hydrogen analyses gave C, 64.18 per cent; H, 7.38 per cent; and O, by difference 28.44 per cent. The neutralization equivalent indicates the presence of one potential carboxyl group per molecule.

Further experimental work, not related herein in detail, established the empirical formula of this crystalline product to be $C_9H_{12}O_3$.

Example II

Fifty parts by weight of furfural was agitated in a closed reactor with ten parts of butadiene and five parts of water for 100 hours at about 300 F., air being expelled from the reactor by evaporation of a small excess of butadiene included in the charge. Pressure during the reaction period was about 350 p. s. i. g. At the end of the time, pressure was released and unreacted butadiene allowed to evaporate. The reaction mixture was subjected to distillation under reduced pressure. The first components removed were water and 3-vinyl-1-cyclohexene. The bulk of the distillate was unreacted furfural. When the residue was reduced to a fairly small volume, 2,3,4,5-bis (Δ2-butenylene)-tetrahydrofuran, resulting from the reaction of furfural with butadiene alone, distilled at about 235 F., the pressure for this part of the distillation being reduced to about 1 mm. Hg. A reddish yellow oil was then distilled, forming a semi-solid mass in the receiver which became solid and crystalline upon cooling and standing. This material distilled in the range 250 to 300 F. at 0.5 mm. This material was predominantly a lactone having the empirical formula of Example I.

A portion of lactone material obtained as described immediately above, was dissolved in ethanol and the resulting solution was admixed with a 10 per cent palladium-on-charcoal catalyst, i. e. charcoal supporting 10 per cent of its weight of palladium, and contacted with free hydrogen at 80 F., under a hydrogen pressure maintained at 40 p. s. i. g., for a reaction period of about 30 minutes. Catalyst was then removed from the reaction mixture by filtration, and the ethanol was distilled to produce a residual saturated hydrogenation product.

Ten parts by weight residual hydrogenation product was added to 50 volumes of concentrated nitric acid containing about 0.5 part of vanadium pentoxide, at such a rate that the temperature of the reaction was maintained between 122 and 140 F. The reaction mixture was further heated after the hydrogenated product was added and then cooled. Crystalline adipic acid was recovered from the cooled reaction mixture, and was recrystallized from concentrated nitric acid.

Adipic acid of high purity was recovered as crystals having a melting point of 304° F. A mixed melting point of a sample of commercial adipic acid was also found to be 304° F.

Example III

The procedure illustrated immediately above was repeated except that the lactone starting material employed was recovered from tar, from the redistillation of furfural in a furfural rerun unit of an extractive distillation system utilized in the separation of butadiene from butene. The tar was redistilled under a vacuum of less than 1 mm. of Hg. The kettle (tar-containing) was heated in an oil bath at a temperature gradually increased from 212 to 392 F.; 2,3,4,5-bis(Δ2-butenylene)-tetrahydrofurfural and the semisolid lactone product of Example I were recovered, the latter in a yield of 25 per cent by weight of the tar. The residue of the tar distillation was a brittle black solid furfural polymer.

Adipic acid was recovered as a product.

Example IV

The procedure of Example III was repeated except that the 2,3,4,5 - bis (Δ2-butenylene)-tetrahydrofurfural and the lactone were not separated, and the overhead lactone-containing product thus obtained was employed as the starting material.

Adipic acid was recovered as a product.

Example V

Aqueous condensate, rejected from a furfural rerun unit employing steam distillation, was concentrated, and an intermediate crude fraction containing a lactone of the empirical formula of Example I, was isolated. This crude fraction was dark brown, sticky, semisolid, and semicrystalline. It had a melting point of about 225 F. and was distilled at 0.5 mm. Hg. pressure, and at 250-300 F., to yield a clear yellow solid mass melting at about 240-250 F. and containing a lactone of the empirical formula of Example I.

A portion of the clear yellow solid mass thus obtained, was dissolved in methanol-containing Raney nickel, and the resulting admixture was contacted with hydrogen under the hydrogenation conditions of time, temperature and pressure of Example I. Residual hydrogenation product was recovered in accordance with the procedure of Example I.

Fifty-four parts by weight of the hydrogenated residual product thus obtained, was placed in a reactor with 524 parts of a 50 per cent aqueous sulfuric acid solution. A solution of 201 parts of sodium dichromate in 100 volumes of water was added to the resulting reaction mixture at a temperature varied from 32-60 F. The resulting reaction admixture was cooled and maintained at a temperature in the 32-60 F. range for two days. It was found that the reaction rate was slow, and accordingly the reaction mixture was heated on a steam bath. The oxidation was then complete after 5 hours.

The aqueous solution was then concentrated and adipic acid was extracted from the concentrated solution with isopropyl ether, and recovered from the extract by distillation to sepa-

We claim:

1. A process for the manufacture of adipic acid from butadiene, water, and furfural comprising, introducing butadiene, water, and furfural into a reaction zone to provide a resulting admixture containing from 3–50 per cent butadiene, and from 1–30 per cent water based on the weight of furfural, maintaining the resulting admixture at a temperature within the limits of 160 and 325° F., for a period of from 5–125 hours, recovering a product fraction from the resulting reaction mixture containing a lactone having a composition in accordance with the empirical formula $C_9H_{12}O_3$, dissolving a lactone-containing fraction thus recovered in an inert solvent and contacting the resulting solution with hydrogen under a pressure to maintain said solution in liquid phase, in the presence of a hydrogenation catalyst at a temperature within the limits of 60–300 F. whereby hydrogenation takes place; removing said solvent and said catalyst from the resulting hydrogenation reaction mixture, whereby residual hydrogenation product is obtained; admixing residual hydrogenation product with an oxidizing agent and maintaining the resulting admixture at a temperature within the limits of 100–200 F., whereby said residual product is oxidized to form adipic acid; and recovering adipic acid as a product of the process.

2. A process for the manufacture of adipic acid, comprising diverting a side stream of furfural from an extractive distillation system wherein furfural is employed as a selective solvent under non-anhydrous conditions in the separation of butadiene from a butadiene-butene hydrocarbon mixture, to a furfural purification system and therein separating furfural of high purity and a tarry residual by-product formed as an impurity during said extractive distillation; vacuum distilling said tarry residue and separating a residual distillation tar product and an overhead distillation product containing a lactone having a composition in accordance with the empirical formula $C_9H_{12}O_3$, dissolving said distillation overhead lactone-containing product in an inert solvent and contacting the resulting solution with hydrogen under a pressure to maintain said solution in liquid phase, in the presence of a hydrogenation catalyst and at a temperature within the limits of 60–300 F., whereby hydrogenation takes place; removing said solvent and said catalyst from the resulting hydrogenation reaction mixture, whereby residual hydrogenation product is obtained; admixing residual hydrogenation product with an oxidizing agent and maintaining the resulting admixture at a temperature within the limits of 100–200 F., whereby said residual product is oxidized to form adipic acid, and recovering adipic acid as a product of the process.

3. A process for the manufacture of adipic acid, comprising removing water from a steam condensate formed during the steam distillation of furfural previously utilized as a solvent in an extractive distillation to separate butadiene from a butadiene-butene hydrocarbon mixture, conducted under non-anhydrous conditions; from a resulting residual steam condensate, separating a light fraction containing a lactone having the composition as illustrated by the empirical formula $C_9H_{12}O_3$, dissolving the lactone-containing fraction thus separated in an inert solvent and contacting the resulting solution with hydrogen under a pressure to maintain said solution in liquid phase, in the presence of a hydrogenation catalyst at a temperature within the limits of 60–300 F., whereby hydrogenation takes place; removing said solvent and said catalyst from the resulting hydrogenation reaction mixture, whereby residual hydrogenation product is obtained, admixing residual hydrogenation product with an oxidizing agent and maintaining the resulting admixture at a temperature within the limits of 100–200 F., whereby said residual product is oxidized to form adipic acid; and recovering adipic acid as a product of the process.

4. A process for the manufacture of adipic acid from butadiene, water, and furfural, comprising introducing butadiene, water, and furfural into a reaction zone to provide a resulting admixture containing from 3–50 per cent butadiene, and from 1–30 per cent water based on the weight of furfural, maintaining the resulting admixture at a temperature within the limits of 160 and 325° F., for a period of from 5–125 hours, recovering a product fraction from the resulting reaction mixture containing a lactone having a composition in accordance with the empirical formula $C_9H_{12}O_3$, dissolving a lactone-containing fraction thus recovered in an inert solvent in a weight ratio to said solvent within the limits of 1:1 to 1:10 and passing hydrogen into contact with the resulting solution under a pressure to maintain said solution in liquid phase, in the presence of from 1 to 15 per cent of a catalyst based on the weight of said lactone and comprising from 1 to 10 per cent by weight of palladium on activated charcoal, for a period of from 1 to 10 hours, and while maintaining the temperature of said solution within the limits of 60 to 100 F., whereby hydrogenation of said lactone takes place; removing catalyst and solvent from the resulting hydrogenation reaction mixture; adding hydrogenation product thus free from said catalyst and said solvent to an admixture of concentrated nitric acid and vanadium pentoxide containing from 0.2 to 10 grams of vanadium pentoxide per 100 ml. of concentrated nitric acid, whereby an exothermic oxidation reaction takes place, regulating the rate of addition of said hydrogenation product of said nitric acid-vanadium pentoxide mixture to maintain the resulting oxidation at a temperature within the range of 130 to 150 F., and recovering adipic acid from the resulting oxidation mixture as a product of the process.

5. A process for the manufacture of adipic acid from butadiene, water, and furfural, comprising introducing butadiene, water, and furfural into a reaction zone to provide a resulting admixture containing from 3–50 per cent butadiene, and from 1–30 per cent water based on the weight of furfural, maintaining the resulting admixture at a temperature within the limits of 160 and 325° F., for a period of from 5–125 hours, recovering a product fraction from the resulting reaction mixture containing a lactone having a composition in accordance with the empirical formula $C_9H_{12}O_3$, dissolving a lactone-containing fraction thus recovered in an inert solvent in a weight ratio to said solvent within the limits of 1:1 to 1:10 and passing hydrogen into contact with the resulting solution under a pressure to maintain said solution in liquid phase, in the presence of nickel as a catalyst in an amount of from 1–15 weight per cent of said lactone, for a period of from 1 to 10 hours, and while maintaining the temperature of said solution within the limits of 60 to 100 F., whereby hydrogenation of said lactone takes place; removing catalyst and solvent from the resulting hydrogenation reaction mixture; adding hydrogenation product thus free of catalyst and solvent to an admixture of concentrated sulfuric acid and aqueous alkali metal dichromate in a mol ratio of sulfuric acid to dichromate within the limits of 1.3:1 to 2:1, whereby an exothermic oxidation takes place; regulating the addition of hydrogenation product to said admixture of sulfuric acid and alkali metal dichromate at a rate to maintain the resulting oxidation at a temperature within the limits of 130 to 150 F.; and recovering adipic acid from the resulting oxidation reaction mixture as a product of the process.

6. The process of claim 5 wherein subsequent to the addition of said solvent-free hydrogenation product to said sulfuric acid-dichromate mixture, the resulting oxidation reaction mixture is further heated at a temperature within said limits of 130–150 F., for a period of from 15 minutes to 1 hour.

7. The process of claim 4 wherein subsequent to the addition of catalyst-free solvent-free hydrogenation product to said nitric acid-vanadium pentoxide mixture, the resulting oxidation reaction mixture is further heated at a temperature within said limits of 130–150 F., for a period of from 15 minutes to 1 hour.

JOHN C. HILLYER.
JAMES T. EDMONDS.

REFERENCES CITED

The following references are of record in the file of this patent:

UNITED STATES PATENTS

| Number | Name | Date |
|---|---|---|
| 1,960,211 | Perkins et al. | May 22, 1934 |
| 2,232,855 | Hopff et al. | Feb. 25, 1941 |
| 2,285,601 | McAllister | June 9, 1942 |
| 2,286,559 | McAllister | June 16, 1942 |